United States Patent
Kim et al.

(10) Patent No.: US 9,025,508 B2
(45) Date of Patent: May 5, 2015

(54) METHOD FOR RECEIVING MOBILE MULTICAST BROADCAST SERVICE IN MULTI-CARRIER WIRELESS COMMUNICATION SYSTEM

(75) Inventors: Eunkyung Kim, Daejeon (KR); Jae Sun Cha, Daejeon (KR); Soojung Jung, Daejeon (KR); Sung Cheol Chang, Daejeon (KR); Kwang Jae Lim, Daejeon (KR); Hyun Lee, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 104 days.

(21) Appl. No.: 13/518,678

(22) PCT Filed: Dec. 22, 2010

(86) PCT No.: PCT/KR2010/009196
§ 371 (c)(1),
(2), (4) Date: Jun. 22, 2012

(87) PCT Pub. No.: WO2011/078572
PCT Pub. Date: Jun. 30, 2011

(65) Prior Publication Data
US 2012/0257564 A1    Oct. 11, 2012

(30) Foreign Application Priority Data

Dec. 23, 2009 (KR) .................. 10-2009-0129478
Dec. 29, 2009 (KR) .................. 10-2009-0132415
Sep. 8, 2010 (KR) .................. 10-2010-0087928
Dec. 21, 2010 (KR) .................. 10-2010-0131447

(51) Int. Cl.
*H04W 4/06* (2009.01)
*H04W 36/06* (2009.01)
(Continued)

(52) U.S. Cl.
CPC ............. *H04W 4/06* (2013.01); *H04W 36/06* (2013.01); *H04W 72/005* (2013.01); *H04W 76/002* (2013.01)

(58) Field of Classification Search
CPC . H04W 76/002; H04W 72/005; H04W 36/06; H04W 4/06; H04W 72/0453; H04W 72/04; H04W 48/12; H04W 72/042; H04W 28/18; H04L 12/189; H04L 5/001; H04L 5/0037; H04L 5/0094; H04L 12/5695; H04L 5/0096; H04L 5/0098; H04L 27/2601
USPC ......... 370/236, 254, 255, 311, 312, 328, 329, 370/331, 338, 464, 467, 496, 522, 524
See application file for complete search history.

(56) References Cited

U.S. PATENT DOCUMENTS 8,155,648 B2    4/2012   Lee et al.
8,634,391 B2 *  1/2014   Kim et al. .................. 370/338
(Continued)

FOREIGN PATENT DOCUMENTS

KR   2005-0073114 A   7/2005
KR   2008-0019160 A   3/2008
(Continued)

OTHER PUBLICATIONS

"DRAFT Standard for Local and metropolitan area networks", IEEE Computer Society and IEEE Microwave Theory and Techniques Society, Part 16: Air Interface for Broadband Wireless Access Systems P802.16Rev2/D7 Oct. 2008), pp. 755-756.*

*Primary Examiner* — Gary Mui
*Assistant Examiner* — Michael Phillips
(74) *Attorney, Agent, or Firm* — Rabin & Berdo, P.C.

(57) ABSTRACT

Method receiving Multicast Broadcast Service (MBS) in a wireless communication system is provided. The method comprises receiving a Dynamic Service Addition (DSA) message through a primary carrier, from a Base Station (BS); switching from the primary carrier to a secondary carrier based on the DSA message; receiving an MBS Configuration message through the secondary carrier, from the BS; and receiving MBS data through the secondary carrier based on the MBS Configuration message, from the BS.

13 Claims, 10 Drawing Sheets

(51) Int. Cl.
*H04W 72/00* (2009.01)
*H04W 76/00* (2009.01)

(56) References Cited

U.S. PATENT DOCUMENTS

| | | | |
|---|---|---|---|
| 8,644,869 B2 * | 2/2014 | Yuk et al. | 455/509 |
| 8,711,773 B2 * | 4/2014 | Yu et al. | 370/328 |
| 8,743,827 B2 * | 6/2014 | Kim et al. | 370/331 |
| 2005/0152392 A1 | 7/2005 | Lim et al. | |
| 2006/0028986 A1 * | 2/2006 | Kwon et al. | 370/230 |
| 2008/0009283 A1 * | 1/2008 | Lim et al. | 455/432.3 |
| 2008/0069019 A1 * | 3/2008 | Fahldieck | 370/310 |
| 2008/0175237 A1 * | 7/2008 | Kim | 370/389 |
| 2008/0212509 A1 * | 9/2008 | Kim et al. | 370/312 |
| 2008/0259905 A1 * | 10/2008 | Connors et al. | 370/350 |
| 2009/0040937 A1 * | 2/2009 | Xhafa et al. | 370/252 |
| 2009/0046637 A1 * | 2/2009 | Kim et al. | 370/329 |
| 2009/0103465 A1 * | 4/2009 | Chow et al. | 370/312 |
| 2009/0109890 A1 * | 4/2009 | Chow et al. | 370/312 |
| 2009/0219849 A1 * | 9/2009 | Alpert et al. | 370/312 |
| 2009/0219850 A1 * | 9/2009 | Lin et al. | 370/312 |
| 2009/0225691 A1 * | 9/2009 | Son | 370/312 |
| 2009/0225695 A1 * | 9/2009 | Kang et al. | 370/315 |
| 2009/0232081 A1 * | 9/2009 | Son et al. | 370/329 |
| 2009/0238107 A1 * | 9/2009 | Li et al. | 370/312 |
| 2010/0034128 A1 * | 2/2010 | Yim et al. | 370/312 |
| 2010/0048225 A1 | 2/2010 | Kwak et al. | |
| 2010/0061289 A1 * | 3/2010 | Mun et al. | 370/312 |
| 2010/0097973 A1 * | 4/2010 | Wu et al. | 370/312 |
| 2010/0135226 A1 * | 6/2010 | Chandramouli et al. | 370/329 |
| 2010/0157900 A1 * | 6/2010 | Moon et al. | 370/328 |
| 2010/0278091 A1 * | 11/2010 | Sung et al. | 370/312 |
| 2010/0302989 A1 | 12/2010 | Sung et al. | |
| 2011/0007681 A1 * | 1/2011 | Park et al. | 370/311 |
| 2011/0026495 A1 * | 2/2011 | Lee et al. | 370/335 |
| 2011/0047289 A1 * | 2/2011 | Venkatachalam et al. | 709/237 |
| 2011/0051651 A1 * | 3/2011 | Wu et al. | 370/312 |
| 2011/0086662 A1 * | 4/2011 | Fong et al. | 455/517 |
| 2011/0182229 A1 * | 7/2011 | Park et al. | 370/312 |
| 2012/0207073 A1 * | 8/2012 | Kim et al. | 370/311 |
| 2014/0233502 A1 * | 8/2014 | Fong et al. | 370/329 |
| 2014/0362803 A1 * | 12/2014 | Chun et al. | 370/329 |

FOREIGN PATENT DOCUMENTS

| | | |
|---|---|---|
| KR | 2009-0035390 A | 4/2009 |
| KR | 2009-0082159 A | 7/2009 |

\* cited by examiner

METHOD FOR RECEIVING MOBILE MULTICAST BROADCAST SERVICE IN MULTI-CARRIER WIRELESS COMMUNICATION SYSTEM

TECHNICAL FIELD

The present invention relates to a wireless communication system and, more particularly, to a method of receiving mobile multicast broadcast service.

BACKGROUND ART

As a candidate of the next-generation wireless communication system, 3rd Generation Partnership Project (3GPP) Long Term Evolution (LTE) and Institute of Electrical and Electronics Engineers (IEEE) 802.16m are being developed. The IEEE 802.16m standard involves the two aspects of the past continuation (i.e., an amendment to the existing IEEE 802.16e standard) and the future continuation (i.e., a standard for the next-generation IMT-Advanced system). Accordingly, the IEEE 802.16m standard is required to fulfill all advanced requirements for the IMT-Advanced system while maintaining compatibility with a Mobile WiMAX system based on the IEEE 802.16e standard.

In general, a wireless communication system uses one bandwidth in order to transmit data. For example, the 2nd generation wireless communication system uses a bandwidth of 200 kHz to 1.25 MHz, and the 3rd wireless communication system uses a bandwidth of 5 MHz to 10 MHz. In order to support an increasing capacity of data transmission, a recent 3GPP LTE or 802.16m system continues to extend its bandwidth up to 20 MHz or higher. In order to increase the transmission capacity, it is indispensable to extend the bandwidth. However, to support a great bandwidth even through a required quality of service is low may result in high power consumption.

Therefore, there is emerging a multi-carrier system which defines a carrier having one bandwidth and a central frequency and can transmit or receive or both data by using a wideband through a plurality of carriers. That is, both the narrow band and the wideband are supported by using one or more carriers. For example, assuming that a single carrier corresponds to a bandwidth of 5 MHz, a bandwidth of up to 20 MHz can be supported by using four carriers.

The IEEE 802.16m system supports an Enhanced Multicast Broadcast Service (E-MBS). The E-MBS is a point-to-multipoint system in which data packets are transmitted at the same time from one source to a plurality of destinations. Broadcast refers to a capability to transmit contents to all users. Multicast refers to contents directed toward a specific group of users who are subscribed in order to receive specific service. Static multicast and dynamic multicast can be supported.

In a wireless communication system supporting multiple carriers, MBS can be received using an MBS configuration message. There is a need for a method of receiving the MBS by distinguishing a case where the MBS configuration message is transmitted through a primary carrier from a case where the MBS configuration message is transmitted through a secondary carrier.

DISCLOSURE

Technical Problem

It is, therefore, an object of the present invention to efficiently and accurately receive MBS in a wireless communication system supporting multiple carriers.

Technical Solution

In accordance with an aspect of the present invention, a method of a Mobile Station (MS) receiving Multicast Broadcast Service (MBS) in a wireless communication system is provided. The method includes receiving a Dynamic Service Addition (DSA) message through a primary carrier, from a Base Station (BS); switching from the primary carrier to a secondary carrier based on the DSA message; receiving an MBS Configuration message through the secondary carrier, from the BS; and receiving MBS data through the secondary carrier based on the MBS Configuration message, from the BS.

The method may further include switching to the primary carrier.

The method may further include transmitting a registration message regarding a negotiation of an MBS capability to the BS or receiving the registration message from the BS, before receiving the DSA message.

The registration message may include MBS capabilities indicating whether macro-diversity is supported or not, and the MBS capabilities may indicate that the MBS is supported for only a Serving BS, that macro-diversity multi-BS MBS is supported, and that multi-BS MBS not macro-diversity is supported.

The DSA message may include at least one of Physical Carrier Information indicating a target carrier to which the MS will switch, information about a point of time at which the carrier switch is started, Evolved-MBS (E-MBS) indicating whether macro-diversity is supported, an E-MBS zone ID indicating an MBS zone valid for connection related to an MBS flow, and an MBS flow parameter regarding mapping between the an E-MBS ID and a Flow ID.

The MBS Configuration message may include at least one of a modulation type of the MBS, a position of an MBS MAP, a point of time at which the MBS MAP is transmitted, and a size of the MBS MAP, and information about an allocation of resources.

The method may further include receiving a change indication indicating whether the received MBS Configuration message is identical with or different from an MBS Configuration message received before, after receiving the MBS Configuration message, decoding the received MBS Configuration message if the change indication indicates that the received MBS Configuration message has been changed.

In accordance with another aspect of the present invention, a method of a Base Station (BS) transmitting Multicast Broadcast Service (MBS) in a wireless communication system is provided. The method includes: transmitting a Dynamic Service Addition (DSA) message to a Mobile Station (MS) through a primary carrier; switching from the primary carrier to a secondary carrier based on the DSA message; transmitting an MBS Configuration message to the MS through the secondary carrier; and transmitting MBS data to the MS through the secondary carrier based on the MBS Configuration message.

The method may further include switching to the primary carrier again after completing the transmission of the MBS data.

The method may further include transmitting a registration message regarding a negotiation of an MBS capability to the MS or receiving the registration message from the MS, before transmitting the DSA message.

The registration message may include MBS capabilities indicating whether macro-diversity is supported or not, and the MBS capabilities may indicate that the MBS is supported for only a Serving BS, that macro-diversity multi-BS MBS is supported, and that multi-BS MBS not macro-diversity is supported.

The DSA message may include at least one of Physical Carrier Information indicating a target carrier to which the BS will switch, information about a point of time at which the carrier switch is started, Evolved-MBS (E-MBS) indicating whether macro-diversity is supported, an E-MBS zone ID indicating an MBS zone valid for connection related to an MBS flow, and an MBS flow parameter regarding mapping between the an E-MBS ID and a Flow ID.

The MBS Configuration message may include at least one of a modulation type of the MBS, a position of an MBS MAP, a point of time at which the MBS MAP is transmitted, and a size of the MBS MAP, and information about an allocation of resources.

In accordance with another aspect of the present invention, a base station for transmitting Multicast Broadcast Service (MBS) in a wireless communication system is provided. The BS includes: a Radio Frequency (RF) unit configured to transmit and receive radio signals; and a processor connected to the RF unit, wherein the processor transmits a Dynamic Service Addition (DSA) message to a Mobile Station (MS) through a primary carrier, switches from the primary carrier to a secondary carrier based on the DSA message, transmits an MBS Configuration message to the MS through the secondary carrier and transmits MBS data to the MS through the secondary carrier based on the MBS Configuration message.

Advantageous Effects

According to the present invention, even in the case where a multi-carrier operation is supported by switching different carrier in order to receive MBS provided through an additional carrier frequency for broadcasting, the multi-carrier operation can be performed without interrupting data and the service.

MODE FOR INVENTION

Figure 1:
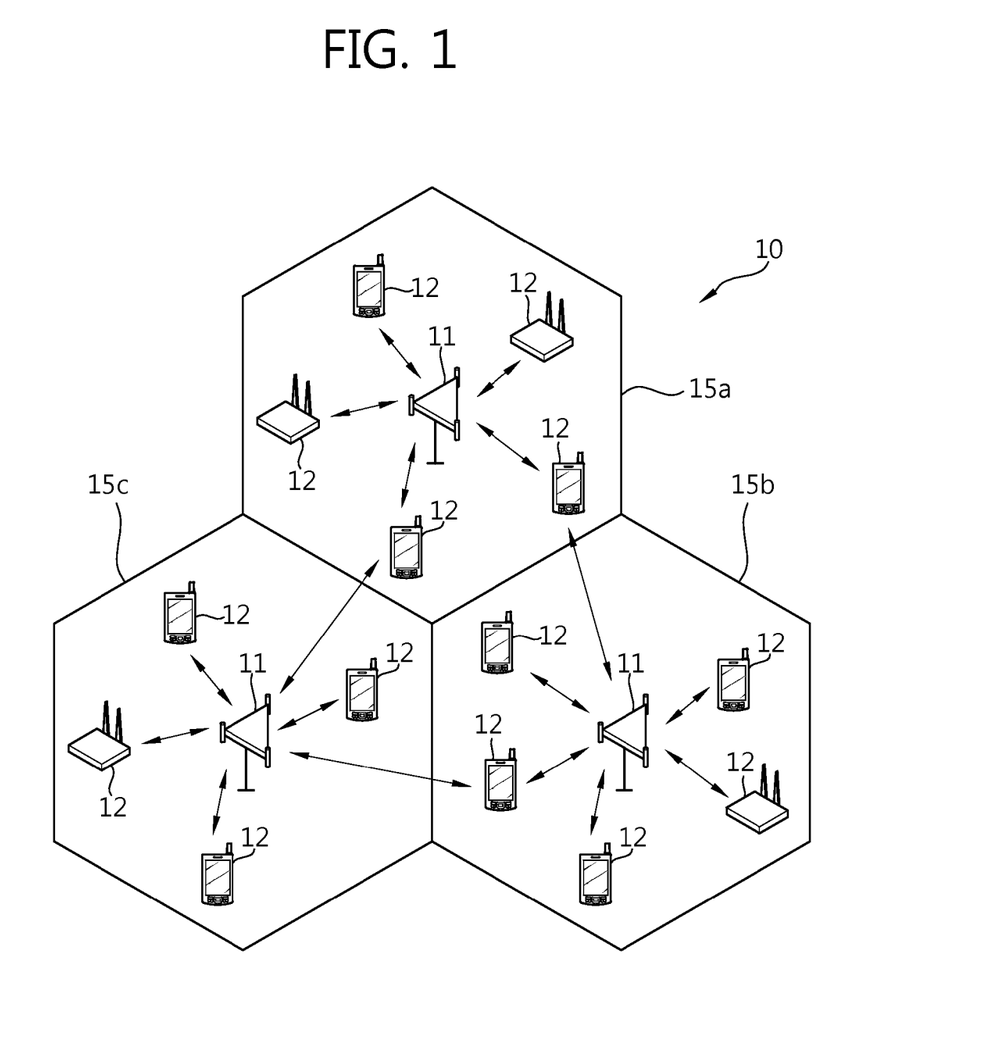
FIG. 1 is a diagram showing a wireless communication system.

FIG. 1 is a diagram showing a wireless communication system. The wireless communication system 10 includes at least one Base Station (BS) 11. The BSs 11 provide communication service to respective geographical areas (in general, called cells) 15a, 15b, and 15c. The cell can be divided into a plurality of areas (called sectors). A Mobile Station 12 can be fixed or mobile and also referred to as another terminology, such as User Equipment (UE), a Mobile Terminal (MT), a User Terminal (UT), a Subscriber Station (SS), a wireless device, a Personal Digital Assistant (PDA), a wireless modem, or a handheld device. The BS 11 commonly refers to a fixed station which communicates with the MSs 12. The BS can also be referred to as another terminology, such as an evolved-NodeB (eNB), a Base Transceiver System (BTS), or an access point. Hereinafter, downlink refers to communication from a BS to an MS, and uplink refers to communication from an MS to a BS. In downlink, a transmitter can be a part of a BS and a receiver can be a part of an MS. In uplink, a transmitter can be a part of an MS and a receiver can be a part of a BS. The flow of uplink or downlink packets between a BS and an MS is also called a service flow.

Figure 2:
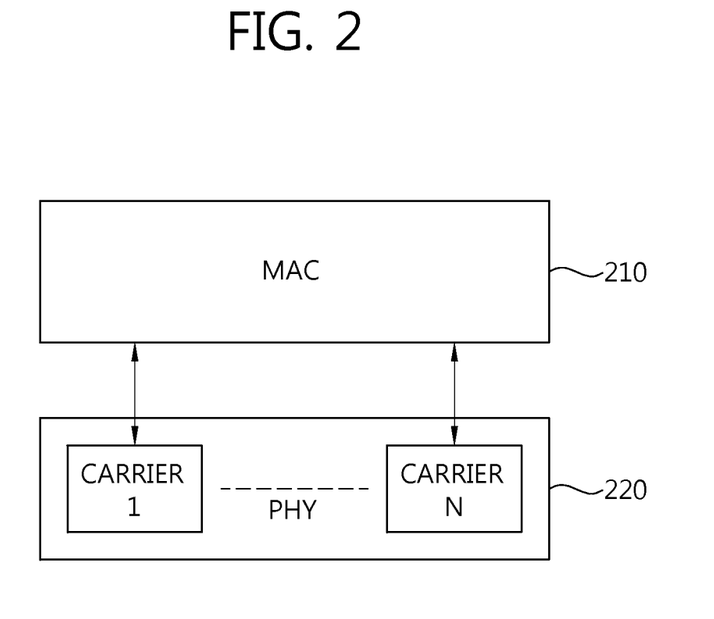
FIG. 2 is a diagram showing an example of a protocol structure for supporting multiple carriers.

FIG. 2 is a diagram showing an example of a protocol structure for supporting multiple carriers. A common Medium Access Control (MAC) entity 210 manages a physical (PHY) layer 220 using a plurality of carriers. An MAC management message transmitted through a specific carrier can be applied to other carriers. The PHY layer 220 can be operated according to a Time Division Duplex (TDD) method or a Frequency Division Duplex (FDD) method or both.

Carriers can be divided into fully configured carrier and partially configured carriers according to their directivity. The fully configured carrier is a bidirectional carrier which can transmit or receive or both all control signals (e.g., synchronization, broadcast, multicast, and unicast control signals) and data. The fully configured carrier can be applied to both a single carrier MS and a multi-carrier MS. The partially configured carrier is a unidirectional carrier which can transmit only downlink data. The partially configured carrier refers to a downlink carrier which is not paired with a downlink carrier in the TDD method or with an uplink carrier in the FDD method. The partially configured carrier can be chiefly used in MBS (Multicast and Broadcast Service) or a Single Frequency Network (SFN), but an MS cannot perform network entry or handover by using the partially configured carrier.

Carriers can be divided into primary carriers and secondary carriers according to whether they have been activated. The primary carrier is always activated and used to transmit traffic and PHY and MAC control signals between a BS and an MS. If an MS served by a BS is in a single carrier mode although the BS supports multiple carriers, communication is performed through only one carrier. The secondary carrier is activated or inactivated according to a specific condition and an additional carrier to the primary carrier. The secondary carrier is used to transmit traffic or subjected to a special command and rule issued by the primary carrier. Here, the term 'activation' refers to a state in which traffic data is transmitted or received or a state in which traffic data is ready to be transmitted or received (i.e., a ready state). The term 'inactivation' refers to a state in which the transmission or reception of traffic data is impossible, but measurement or the transmission or reception of minimum information is possible.

In one common MAC of a multi-carrier system, radio resources are transmitted or received through a primary carrier and one or more secondary carriers. However, full control, such as the mobility, state, and context of an MS, is performed through the primary carrier.

An MS can use only one primary carrier or can use the primary carrier and one or more secondary carriers. An MS can be allocated the primary carrier or the secondary carrier or both by a BS. The primary carrier can be a fully configured carrier, and it is a carrier through which pieces of major control information are exchanged between a BS and an MS. The secondary carrier can be a fully configured carrier or a partially configured carrier, and it is a carrier allocated at the request of an MS or according to the instruction of a BS. The secondary carrier is chiefly used as a carrier for broadcasting and a dedicated carrier.

In a wireless communication system supporting multiple carriers, a pertinent connection of an MS to the PHY layer can be switched from the primary carrier to the secondary carrier or from the secondary carrier to the primary carrier according to the instruction of a BS. This is called a carrier switch (or carrier switching). The carrier switch is frequently generated in case where the secondary carrier is the partially configured carrier.

A method of receiving MBS is described below.

In order to receive MBS (Multicast Broadcast Service), an MS performs service configuration with a BS through Dynamic Service Addition (DSA). An MS performs a Dynamic Service Change (DSC) in order to change the MBS and performs Dynamic Service Deletion (DSD) in order to delete the MBS. Hereinafter, explanation and description about DSA also may be applied to DSC and DSD.

Figure 3:
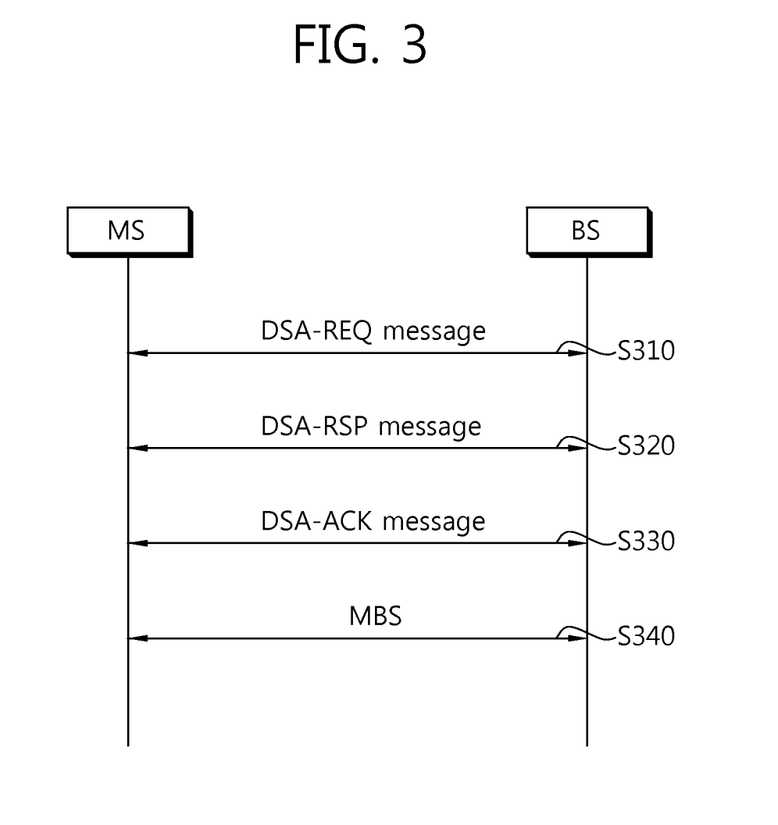
FIG. 3 shows a process of DSA being performed between an MS and a BS.

In the DSA process, an MS or a BS exchange pieces of information through DSA messages, such as a DSA request message (DSA-REQ) to request the DSA, a DSA response message (DSA-RSP) which is a response to the DSA request, and a DSA acknowledgement message (DSA-ACK) which is an acknowledgement message for the DSA-RSP message. Hereinafter, DSA message means DSA request message, DSA response message or DSA acknowledgement message FIG. 3 shows a process of DSA being performed between an MS and a BS.

A BS or MS can request an MBS flow by sending a DSA request message to the MS or BS in order to configure a new MBS at step S310. In response thereto, the MS or BS sends a DSA response message, including MBS-related parameters, to the BS or MS at step S320. The MBS-related information transmitted in this process can include E-MBS ID (or called as a multicast station ID (MSTID)) used by an MS in order to receive MBS, a flow ID (FID), an MBS zone ID, MBS carrier information, and so on. The BS or MS acquires service flow information through the information included in the DSA-RSP message.

In response to the DSA response message, the BS or MS can transmit a DSA acknowledgement message to the MS or BS at step S330. The MS or BS can configure MBS on the basis of the pieces of received service flow information at step S340. The DSA process is only an example, and MBS flow may be configured by requesting of BS or by requesting of MS.

In order for an MS to receive MBS in a mobile wireless access system supporting multiple carriers, the MS which has acquired service flow information configures MBS using an MBS configuration message (e.g., an AAI_E-MBS-CFG message in IEEE 802.16m) transmitted through a carrier. The MBS configuration message can include MBS zone-related information, such as an MBS zone ID, a E-MBS ID, MBS MAP (Mobile Application Part) timing offset of an MBS zone, and resource allocation information (e.g., a position or size) which are served by a BS.

Hereinafter, a method of receiving MBS according to the present invention is described below.

In case where MBS is provided through a specific carrier, MBS-related capability negotiation is required in addition to capability negotiation for carrier-related information. This capability negotiation process is chiefly performed in a registration process and can also be performed in other processes. An MS informs a BS whether the BS can receive MBS. If the BS can receive the MBS, the MS informs the BS whether a single BS or a multi-BS can receive the MBS. If the multi-BS can receive the MBS, the MS also informs the multi-BS whether it can receive macro-diversity MBS. A BS informs an MS whether MBS is available. If the MBS is available, the BS informs the MS whether single BS MBS or multi-BS MBS is available. If the multi-BS MBS is available, the BS can inform the MS whether macro-diversity MBS is available. In this capability negotiation process, a BS and an MS can transmit two or more capabilities.

A process of performing a capability negotiation is described in detail below. First, an MS informs a BS of the support of MBS transmission through a registration request message (see AAI-REG-REQ in 802.16m D10 Paragraph 16.2.3.7). The BS indicates whether an MBS mode for the MS is supported or not through a registration response message (see AAI-REG-RSP in 802.16m D10). When the MS registers the reception of MBS as described above, the BS or the MS initiates a DSA process for MBS connection. In order to prepare for an MBS operation, the MS may receive a System Configuration Descriptor (SCD) message or an MBS-CFG message and obtain pieces of information related to the configuration of MBS from the SCD message or the MBS-CFG message.

The registration request message that requests registration may include MBS capabilities in order to indicate whether the MBS is supported or not. For example, assuming that the MBS capabilities have 3 bits of Bit#0, Bit#1, and Bit#2, if the Bit#0 is set to 1 only, it means that the MBS is supported for only a Serving ABS (S-ABS). When the Bit#1 is set to 1, it means that macro-diversity multi-BS MBS can be supported. When the Bit#2 is set to 1, it means that multi-BS MBS not macro-diversity can be supported. Furthermore, when all the Bit#0 to Bit#2 are set to 0, it means that the MBS is not supported.

The MBS capabilities may be included in a Service Basic Capability (SBC) message and then individually received.

When the capability negotiation process is completed, an MBS flow is configured. The configuration of the MBS flow is chiefly performed through a DSA message and an MBS-CFG message. If an MS performs communication through one transceiver, the MS obtains a point of time at which the MS switches to another carrier where the MS does not perform communication currently and receives MBS.

Furthermore, information about the configuration of MBS may be chiefly included in an MBS-CFG message, but may be included an MAC header, a control channel, or another message. The information about the configuration of MBS may be included in a message, channel, or header that transfers system-related information and a DSA message and then redundantly received.

Figure 4:
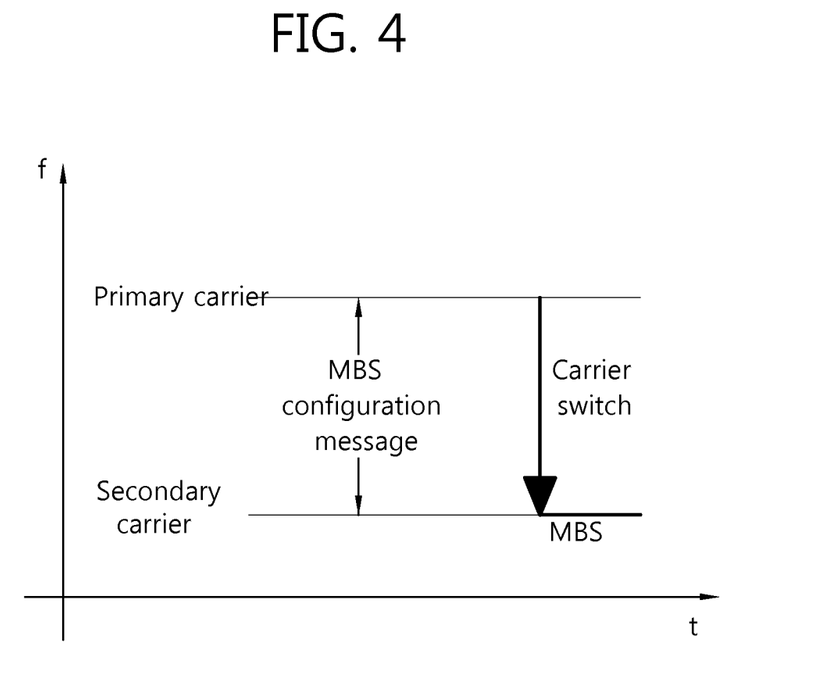
FIG. 4 shows the reception of an MBS-CFG message.

FIG. 4 shows the reception of an MBS-CFG message. The MBS-CFG message may be transmitted through a primary carrier or a secondary carrier.

Referring to FIG. 4, an MS may receive MBS through the primary carrier or the secondary carrier. The MBS has to be able to be configured so that whether the MS will receive the MBS through what carrier is clear. If the MS wants to receive the MBS through the secondary carrier, the MS performs a carrier switch through a DSA process. In the carrier switch, MBS data, an MBS Mobile Application Part (MAP), and MBS content included in the MBS-CFG message are transmitted through the activated secondary carrier.

Meanwhile, if the MBS-CFG message and the MBS data are transmitted through the secondary carrier, the MS including one transceiver performs a carrier switch to the primary carrier of the MS as follows.

1) When the MS is prepared to receive the MBS, the MS initiates the carrier switch.

2) The MS may switch to the secondary carrier periodically in order to receive the MBS data. After receiving the MBS data, the MS returns to the primary carrier. An interval that has to remain in the primary carrier during the switch process may be indicated by a unicast available interval bitmap parameter.

3) The MS may stop the carrier switch when the MBS is stopped.

4) After stopping the carrier switch, the MS may remain in the primary carrier until the carrier switch is started again.

Figure 5:
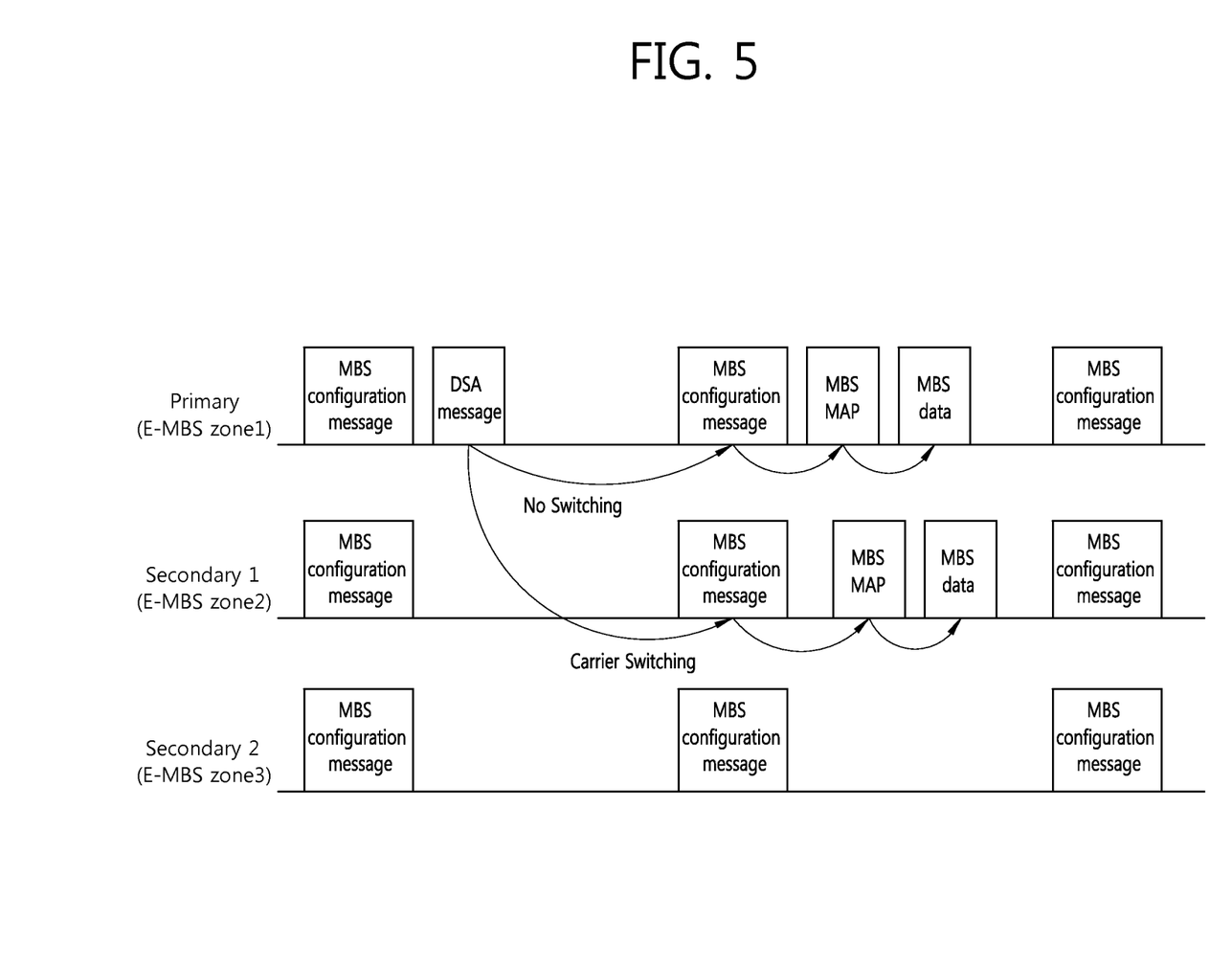
FIG. 5 shows a DSA process including an MBS flow requested by an MS according to the present invention.
Figure 6:
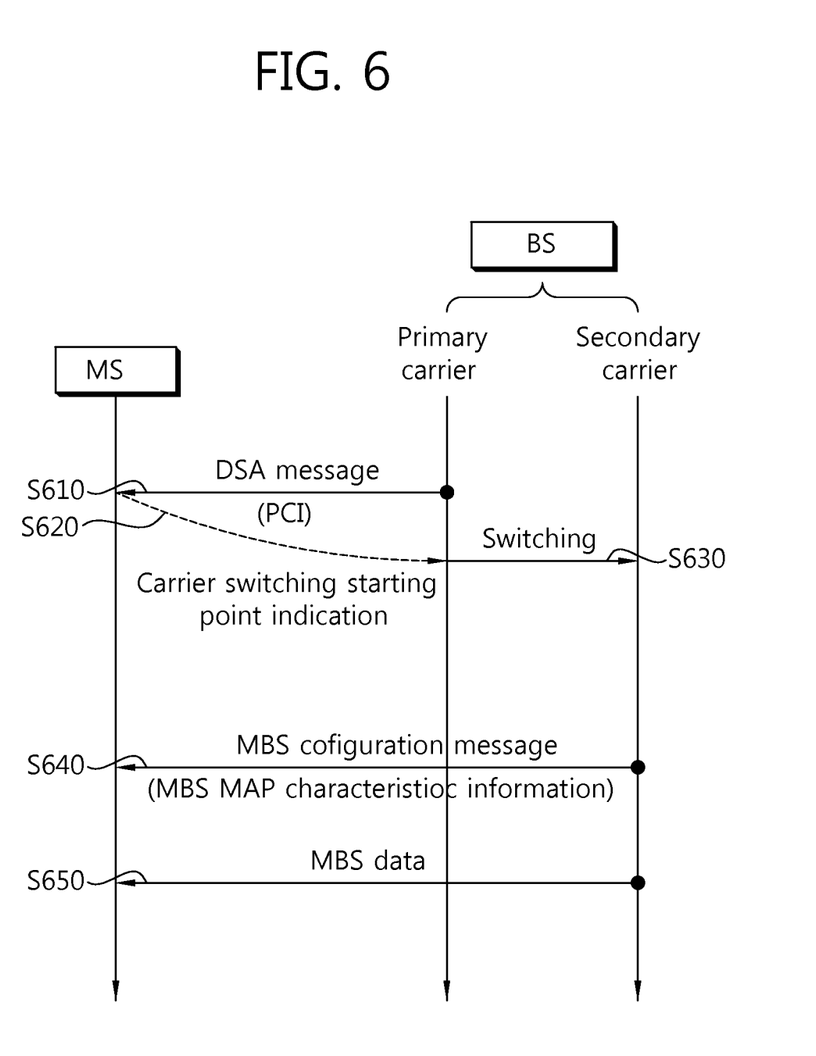
FIG. 6 is a flowchart illustrating a DSA process.

FIG. 5 shows a DSA process including an MBS flow requested by an MS according to the present invention, and FIG. 6 is a flowchart illustrating a DSA process.

Referring to FIGS. 5 and 6, when the MS receives a DSA message from a BS (or the BS may receive the DSA message from the MS) through a first carrier, the DSA process is started at step S610. Whether a carrier switch will be performed is determined based on the DSA message. The DSA message may include Physical Carrier Information (PCI) or information about a point of time at which the carrier switch is started. Here, the PCI indicates a carrier through which an MBS-CFG message is transmitted after the carrier switch is completed, that is, a target carrier to which the MS will switch or a carrier redirected by the BS. When the point of time at which the carrier switch is started is indicated based on the DSA message at step S620, the point of time at which the carrier switch is started may be a frame (or a subframe) right after the DSA message is transmitted or may be a specific point of time after the DSA message is transmitted.

Table 1 below shows an example of the format of a DSA request message.

TABLE 1

| Parameter | Note |
|---|---|
| E-MBS Service | Indicates whether the E-MBS Serice is being requested or provided for the connection that is being setup. 1 indicates support, 0 indicates not support.<br>Bit#0: E-MBS in S-ABS only<br>Bit#1: E-MBS in a multi-ABS Zone supporting macro-diversity<br>Bit#2: E-MBS in a multi-ABS Zone not supporting macro-diversity<br>If all Bit#0~Bit#2 are set to 0, it indicates no E-MBS is supported |
| E-MBS Zone ID | Indicates an E-MBS zone where the connection for associated service flow is valid |
| E-MBS Service Flow Parameter | Mapping of E-MBS ID and FID are included |
| Physical Carrier Index | Target carrier which the AMS switches or is redirected by ABS to |

Referring to Table 1, the DSA message may include Evolved-Multicast Broadcast Service (E-MBS) indicating whether MBS will be requested or provided through connection with a BS, an E-MBS zone ID indicating an MBS zone valid for MBS flow-related connection, and an E-MBS flow parameter regarding mapping between an E-MBS ID and a Flow ID (FID). A Physical Carrier Index (PCI) indicates a target carrier to which an MS will switch or a carrier redirected by a BS.

The E-MBS Service includes information about whether MBS supports macro-diversity or not likes a registration request message. For example, assuming that MBS capabilities include 3 bits of Bit#0, Bit#1, and Bit#2, if the Bit#0 is set to 1, it means that the MBS is supported for only an S-ABS. When the Bit#1 is set to 1, it means that macro-diversity multi-BS MBS can be supported. When the Bit#2 is set to 1, it means that multi-BS MBS not macro-diversity can be supported. Furthermore, when all the Bit#0 to Bit#2 are set to 0, it means that the MBS is not supported.

If a carrier switch is indicated in the DSA message, the MS performs a carrier switch to a second carrier on the basis of PCI or a point of time at which the carrier switch is started, which is included in the DSA message at step S630. Here, a carrier indicated by the PCI is used as the second carrier.

After the MS performs the carrier switch, the MS receives an MBS-CFG message through the second carrier at step S640. The MBS-CFG message may include MBS-related parameter information necessary to configure the MBS. In particular, the MBS-CFG message may include pieces of information about the characteristics of the MBS MAP, for example, a modulation type and the position or size of the MBS MAP (or a point of time at which the MBS MAP is transmitted) or information about the allocation of resources. An MBS-CFG message received though the second carrier before the DSA process is initiated may be disregarded. An MBS-CFG message received after the MBS-CFG message including the MBS-related parameter information may be disregarded, and the reception itself of the MBS-CFG message received after the MBS-CFG message including the MBS-related parameter information may be omitted.

Meanwhile, the MS may return to the primary carrier again even before the MBS is completed and then receive unicast data or may return to the primary carrier after the MBS is completed.

The DSA process may be performed at the request of the MS or at the request of the BS. If the DSA process is performed at the request of the MS, the MS transmits a DSA request message to the BS, receives a DSA-RSP message from the BS, and receives the MBS based on the DSA-RSP message. If the DSA process is performed at the request of the BS, the BS transmits a DSA request message to the MS, receives a DSA-RSP message from the MS, and transmits the MBS based on the DSA-RSP message. If the BS transmits the DSA-RSP message, it corresponds to contents that the MBS is configured. If the MS transmits the DSA-RSP message, it corresponds to a concept that the MBS to be received by the MS is checked.

Meanwhile, the MS may receive the DSA message including a point of time at which the MBS-CFG message is transmitted. Furthermore, the DSA message may include all or part of the contents of the MBS-CFG message. Furthermore, the DSA message may include MBS-related parameter information included in the MBS-CFG message. As described above, the reception of the MBS-CFG message may be assisted through the DSA-RSP message.

The MBS-CFG message may be periodically transmitted for each frame (or superframe), but a point of time at which the MBS-CFG message is transmitted may be designated and the MBS-CFG message may be transmitted at the point of time. The point of time at which the MBS-CFG message is transmitted may exist in each superframe, frame, or subframe.

The point of time at which the MBS-CFG message is transmitted may be included in the DSA message, but may be included in a message, channel, or header that transfers system-related information. Here, the message, channel, or header that transfers system-related information and the DSA message may be redundantly transmitted.

Next, the MS receives the MBS MAP on the basis of the position (or the point of time at which the MBS MAP is transmitted) and size of the MBS MAP included in the MBS-CFG message and receives MBS data according to an indication of the MBS MAP at step S650.

Meanwhile, the MS may transmit a registration request message for negotiating the support performance of the MBS to the BS before receiving the DSA message as described above.

Referring to FIG. 5, if DSA does not indicate a carrier switch, the MS performs a DSA process without performing a carrier switch. The MS receives the MBS MAP based on an MBS-CFG message transmitted through a primary carrier and receives MBS data. Processes of receiving the MBS-CFG message, the MBS MAP, and the MBS data are the same as those described in the DSA process performed when a carrier switch is indicated.

Figure 7:
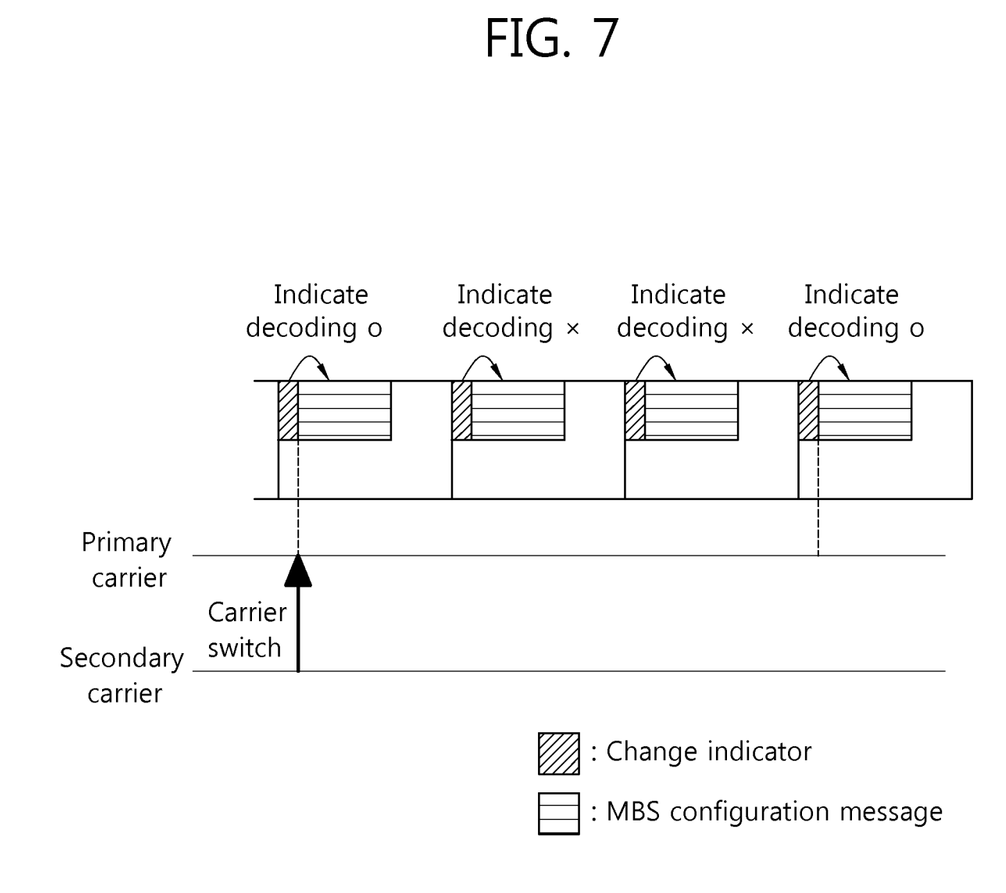
FIG. 7 shows an example in which an MBS-CFG message is received by using a change indication.

FIG. 7 shows an example in which an MBS-CFG message is received by using a change indication.

Referring to FIG. 7, the MBS-CFG message may be periodically transmitted. An MS may switch from a secondary carrier to a primary carrier through which the MBS-CFG message is transmitted in order to receive the MBS-CFG message. If there is no change in the MBS-CFG message, the MBS-CFG message having the same contents needs not to be received. In this case, information about whether a current MBS-CFG message is identical with or different from an MBS-CFG message transmitted right before may be transmitted to the MS through a change indication indicating that there is no change in the MBS-CFG message. Accordingly, the MS may receive the change indication and decode the MBS-CFG message only when the MBS-CFG message has been changed.

If the reception of an MBS-CFG message is unnecessary because a current MBS-CFG message is identical with an MBS-CFG message transmitted right before, the reception of the MBS-CFG message may be omitted or the existing MBS may continue to be used without decoding the MBS-CFG message.

The change indication may be placed in the MBS MAP, the MBS-CFG message, or another message, channel, or header.

Figure 8:
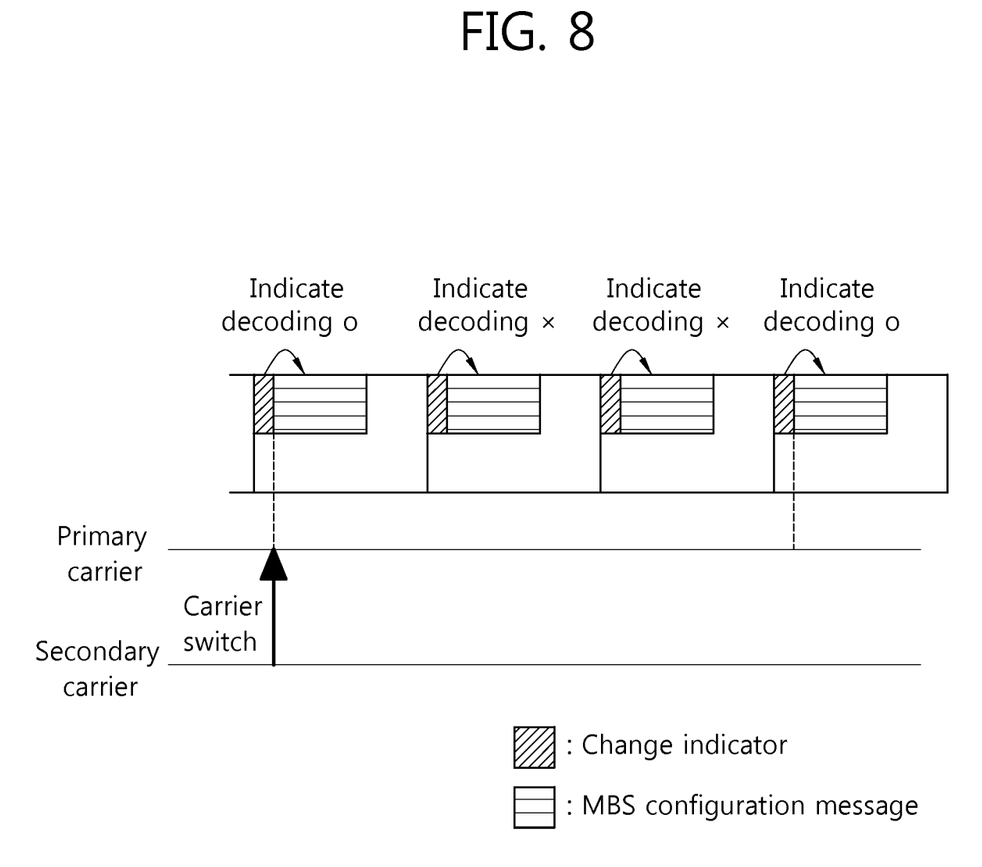
FIG. 8 show examples in which a point of time at which an MBS-CFG message is transmitted or a point of time at which the MBS MAP is transmitted is indicated in a process of receiving MBS according to the present invention.
Figure 9:
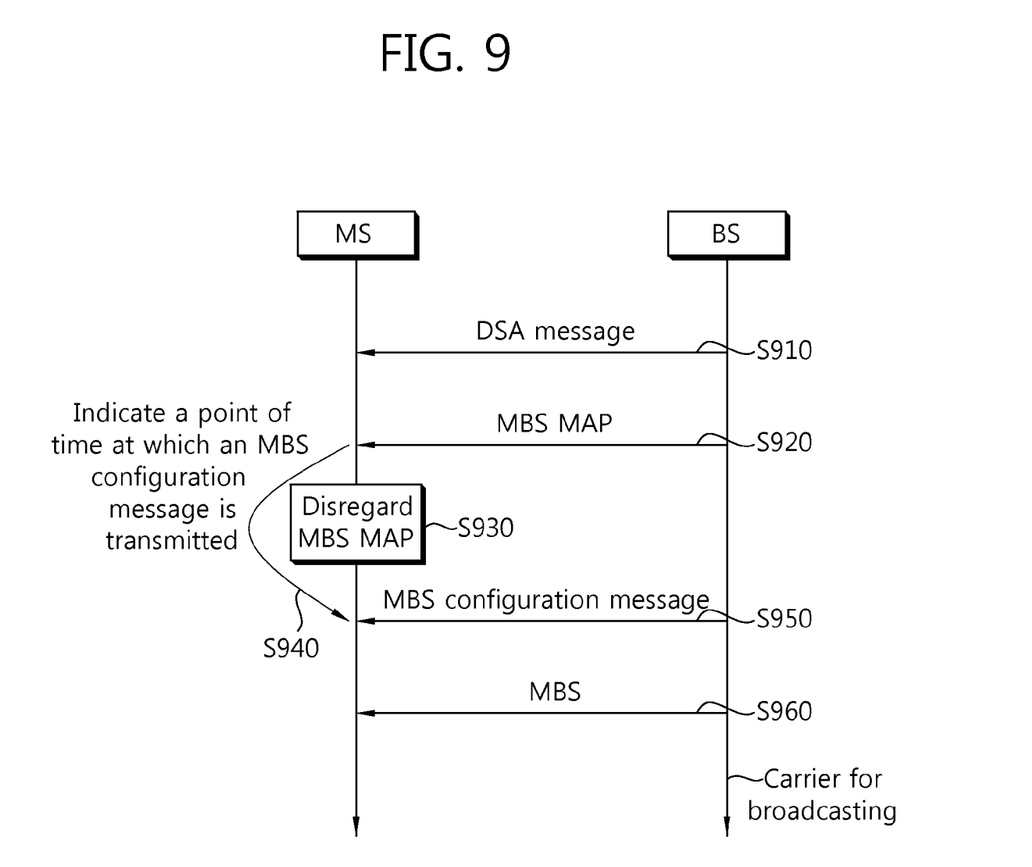
FIG. 9 show examples in which a point of time at which an MBS-CFG message is transmitted or a point of time at which the MBS MAP is transmitted is indicated in a process of receiving MBS according to the present invention.

FIGS. 8 and 9 show examples in which a point of time at which an MBS-CFG message is transmitted or a point of time at which the MBS MAP is transmitted is indicated in a process of receiving MBS according to the present invention.

Referring to FIG. 8, an MS receives a DSA message from a BS at step S810. The DSA message includes a point of time at which an MBS-CFG message is transmitted or a point of time at which the MBS MAP is transmitted. The point of time at which the MBS-CFG message is transmitted may be indicated through the DSA message at step S820. After the MS receives the MBS-CFG message at step S830, the MBS-CFG message indicates a point of time at which the MBS MAP is transmitted at step S840. The MS receives the MBS MAP at step S850. That is, the MBS-CFG message first received helps to receive the MBS MAP.

Next, the MS receives MBS from the BS on the basis of the MBS MAP at step S860. If a point of time at which the MBS MAP is transmitted is included in an MBS-CFG message and the MBS-CFG message is transmitted, a message overhead resulting from the transmission of a DSA message can be reduced. If the point of time at which the MBS MAP is transmitted is included in the DSA message, the MBS-CFG message does not need to include the point of time at which the MBS MAP is transmitted.

Referring to FIG. 9, the MS receives a DSA message from a BS at step S910. The MS has to receive an MBS-CFG message before receiving the MBS MAP. If a point of time at which the MBS MAP is transmitted is prior to a point of time at which the MBS-CFG message is transmitted, the MS disregards an MBS MAP message received before receiving the MBS-CFG message at step S930 although the MS receives the MBS MAP at step S920.

The MBS MAP may include a point of time at which the MBS-CFG message is transmitted. In this case, the point of time at which the MBS-CFG message is transmitted is indicated in the MBS MAP at step S940, and the MS may receive the MBS-CFG message on the basis of the MBS MAP at step S950. As described above, the MBS MAP may help to receive the MBS-CFG message. Finally, the MS receives MBS on the basis of the MBS MAP receive based on the MBS-CFG message at step S960.

If the BS initiates the DSA process, the BS may include pieces of information related to the configuration of MBS, for example, a point of time at which an MBS MAP is transmitted, information about the allocation of resources, a carrier through which the MBS MAP is transmitted, and a point of which at which a carrier switch is performed, in an MBS-CFG message when adding an MBS flow and transmit the MBS-CFG message. Furthermore, the MBS-CFG message, including a point of time at which the MBS-CFG message is transmitted or information about the allocation of resources, may also be included and transmitted. The pieces of information related to the configuration of MBS may be split, included in the DSA message and the MBS-CFG message, and then transmitted, or the pieces of information related to the configuration of MBS may be included in the DSA message and the MBS-CFG message and then redundantly transmitted.

If the BS tries to add the MBS flow, the MS may reject the MBS flow if it is not interested in MBS. Furthermore, when the MS tries to add the MBS flow through the DSA request message, the BS may reject the MBS flow through a DSA-RSP message.

The BS may transmit a different MBS-CFG message for each carrier. In this case, the different MBS-CFG message may be configured to include only information about the configuration of MBS served by each carrier and then transmitted.

Furthermore, in the case where information about the configuration of neighbor MBS within an MBS zone to which the BS belongs is transmitted, if a neighbor BS, from among BS belonging to the MBS zone, belongs to the same MBS zone, pieces of information related to MBS for the neighbor BS needs not to be unnecessarily transmitted. In this case, a BS placed at a boundary area may transmit pieces of information related to MBS in order to reduce overhead.

In the description of the method receiving MBS as described above, a case where pieces of information related to MBS is changed or deleted may also be applied to a Dynamic Service Change (DSC) process or a Dynamic Service Deletion (DSD) process. The Dynamic Service Change (DSC) process or the Dynamic Service Deletion (DSD) process may be usefully used when a point of time at which MBS content is transmitted, information about the allocation of the MBS content, a carrier through the MBS content is transmitted, and a point of time at which a carrier switch is performed.

Furthermore, in the above example, the description of the example in which the MS includes one transceiver may also be applied to a case where an MS includes a plurality of transceivers. An MS including a plurality of transceivers may receive MBS data through other carriers, while communicating with a BS through a primary carrier.

For example, if an MS includes transceivers, one of the transceivers may receive MBS by performing a carrier switch between a first secondary carrier S1 and a second secondary carrier S2 in the state in which the other of the transceivers remains connected to a primary carrier. In an alternative embodiment, one of the transceivers may receive MBS by performing a carrier switch between a first primary carrier and a first secondary carrier S1 in the state in which the other of the transceivers remains connected to a second secondary carrier S2.

Figure 10:
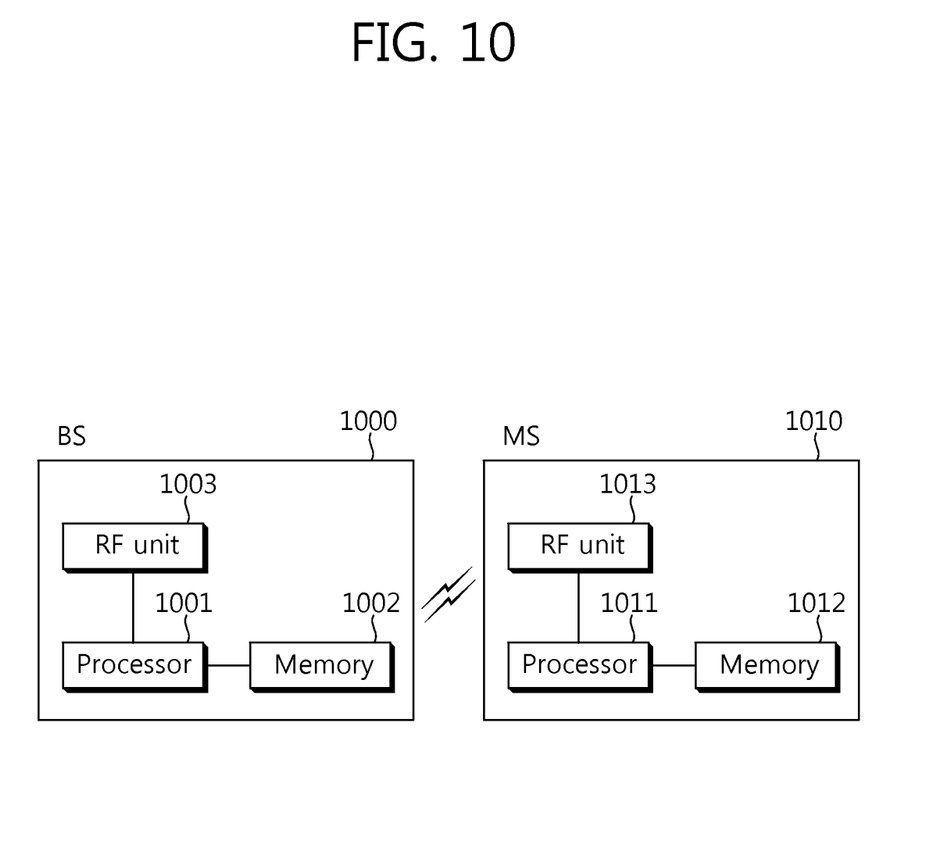
FIG. 10 is a block diagram of a wireless communication system according to the present invention.

FIG. 10 is a block diagram of a wireless communication system according to the present invention.

A BS 1000 includes a processor 1001, memory 1002, and a Radio Frequency (RF) unit 1003. The memory 1002 is connected to the processor 1001 and configured to store various pieces of information necessary to drive the processor 1001. The RF unit 1003 is connected to the processor 1001 and configured to transmit and/or receive radio signals. The processor 1001 embodies the proposed functions, processes and/or method. The layers of a radio interface protocol may be embodied by the processor 1001.

An MS 1010 includes a processor 1011, memory 1012, and an RF unit 1013. The memory 1012 is connected to the processor 1011 and configured to store various pieces of information necessary to drive the processor 1011. The RF unit 1013 is connected to the processor 1011 and configured to transmit and/or receive radio signals. The processor 1011 embodies the proposed functions, processes and/or method. The layers of a radio interface protocol may be embodied by the processor 1011.

The processor 1001 of the BS 1000 embodies the operations of the BS described in connection with the embodiments of FIGS. 4 and 9, and the processor 1011 of the MS 1010 may embody the operations of the MS described in connection with the embodiments of FIGS. 4 and 9. The processor 1001 or 1011 may further include a modem.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is embodied in software, the above-described scheme may be embodied by using a module (process or function) that performs the above function. The module may be stored in the memory and executed by the processor. The memory may be placed inside or outside the processor and connected to the processor using a variety of well-known means.

In the above examples, some methods have been described as a series of the steps or blocks on the basis of the flowcharts. It is, however, to be noted that the present invention is not limited to the sequences of the steps, and a certain step can be performed according to a different step and a different sequence or according to the same step and the same sequence, described above. Furthermore, those skilled in the art will appreciate that the steps illustrated in the flowcharts are not exclusive and other steps can be included in the flowcharts or one or more of the steps can be deleted without departing from the scope of the present invention.

While the invention has been shown and described with respect to the preferred embodiments, it will be understood by those skilled in the art that various changes and modifications may be made without departing from the spirit and scope of the invention as defined in the following claims.

The invention claimed is:

1. A method of a Mobile Station (MS) receiving Multicast Broadcast Service (MBS) in a wireless communication system, the method comprising:
   receiving a Dynamic Service Addition (DSA) message through a primary carrier, from a Base Station (BS);
   switching from the primary carrier to a secondary carrier based on the DSA message;
   receiving an MBS Configuration message through the secondary carrier, from the BS;
   receiving MBS data through the secondary carrier based on the MBS Configuration message, from the BS; and
   receiving a change indication indicating whether the received MBS Configuration message is identical with or different from an MBS Configuration message received before, and decoding the received MBS Configuration message if the change indication indicates that the received MBS Configuration message has been changed.

2. The method of claim 1, further comprising switching to the primary carrier.

3. The method of claim 1, further comprising transmitting a registration message regarding a negotiation of an MBS capability to the BS or receiving the registration message from the BS, before receiving the DSA message.

4. The method of claim 3, wherein:
   the registration message comprises MBS capabilities indicating whether macro-diversity is supported or not, and
   the MBS capabilities indicate that the MBS is supported for only a Serving BS, that macro-diversity multi-BS MBS is supported, and that multi-BS MBS not macro-diversity is supported.

5. The method of claim 1, wherein the DSA message comprises at least one of Physical Carrier Information indicating a target carrier to which the MS will switch, information about a point of time at which the carrier switch is started, Evolved-MBS (E-MBS) indicating whether macro-diversity is supported, an E-MBS zone ID indicating an MBS zone valid for connection related to an MBS flow, and an MBS flow parameter regarding mapping between the an E-MBS ID and a Flow ID.

6. The method of claim 1, wherein the MBS Configuration message comprises at least one of a modulation type of the MBS, a position of an MBS MAP, a point of time at which the MBS MAP is transmitted, and a size of the MBS MAP, and information about an allocation of resources.

7. A method of a Base Station (BS) transmitting Multicast Broadcast Service (MBS) in a wireless communication system, the method comprising:
   transmitting a Dynamic Service Addition (DSA) message to a Mobile Station (MS) through a primary carrier;
   switching from the primary carrier to a secondary carrier based on the DSA message;
   transmitting an MBS Configuration message to the MS through the secondary carrier;
   transmitting MBS data to the MS through the secondary carrier based on the MBS Configuration message; and
   transmitting a change indication indicating whether the transmitted MBS Configuration message is identical with or different from an MBS Configuration message transmitted before.

8. The method of claim 7, further comprising switching to the primary carrier again after completing the transmission of the MBS data.

9. The method of claim 7, further comprising transmitting a registration message regarding a negotiation of an MBS capability to the MS or receiving the registration message from the MS, before transmitting the DSA message.

10. The method of claim 9, wherein:
the registration message comprises MBS capabilities indicating whether macro-diversity is supported or not, and
the MBS capabilities indicate that the MBS is supported for only a Serving BS, that macro-diversity multi-BS MBS is supported, and that multi-BS MBS not macro-diversity is supported.

11. The method of claim 7, wherein the DSA message comprises at least one of Physical Carrier Information indicating a target carrier to which the BS will switch, information about a point of time at which the carrier switch is started, Evolved-MBS (E-MBS) indicating whether macro-diversity is supported, an E-MBS zone ID indicating an MBS zone valid for connection related to an MBS flow, and an MBS flow parameter regarding mapping between the an E-MBS ID and a Flow ID.

12. The method of claim 7, wherein the MBS Configuration message comprises at least one of a modulation type of the MBS, a position of an MBS MAP, a point of time at which the MBS MAP is transmitted, and a size of the MBS MAP, and information about an allocation of resources.

13. A base station (BS) for transmitting Multicast Broadcast Service (MBS) in a wireless communication system, the BS comprising:
a Radio Frequency (RF) unit configured to transmit and receive radio signals; and
a processor connected to the RF unit,
wherein the processor
transmits a Dynamic Service Addition (DSA) message to a Mobile Station (MS) through a primary carrier,
switches from the primary carrier to a secondary carrier based on the DSA message,
transmits an MBS Configuration message to the MS through the secondary carrier,
transmits MBS data to the MS through the secondary carrier based on the MBS Configuration message; and
transmits a change indication indicating whether the transmitted MBS Configuration message is identical with or different from an MBS Configuration message transmitted before.

* * * * *